United States Patent
Uzrad-Nali et al.

(10) Patent No.: US 7,213,045 B2
(45) Date of Patent: *May 1, 2007

(54) APPARATUS AND METHOD FOR TRANSMIT TRANSPORT PROTOCOL TERMINATION

(75) Inventors: Oran Uzrad-Nali, Sunnyvale, CA (US); Dror Har-Chen, Sunnyvale, CA (US)

(73) Assignee: Silverback Systems Inc., Campbell, CA (US)

( * ) Notice: Subject to any disclaimer, the term of this patent is extended or adjusted under 35 U.S.C. 154(b) by 569 days.

This patent is subject to a terminal disclaimer.

(21) Appl. No.: 10/219,673

(22) Filed: Aug. 16, 2002

(65) Prior Publication Data

US 2004/0064815 A1 Apr. 1, 2004

(51) Int. Cl.
*G06F 15/16* (2006.01)

(52) U.S. Cl. .................. 709/200; 709/201; 709/230; 709/237; 370/229; 370/230; 370/231; 370/235; 370/236; 370/252; 370/254

(58) Field of Classification Search ................ 709/230, 709/238, 250; 370/389, 465–466, 469, 471, 370/474–476, 351–352, 229–231, 235, 236, 370/411–419, 428

See application file for complete search history.

(56) References Cited

U.S. PATENT DOCUMENTS

| 5,404,469 | A | 4/1995 | Chung et al. |
| 5,768,528 | A | 6/1998 | Stumm |
| 5,933,627 | A | 8/1999 | Parady |
| 5,996,019 | A * | 11/1999 | Hauser et al. ............. 709/235 |
| 6,167,503 | A | 12/2000 | Jouppi |
| 6,311,261 | B1 | 10/2001 | Chamdani |
| 6,463,527 | B1 | 10/2002 | Vishkin |
| 6,470,415 | B1 * | 10/2002 | Starr et al. ................ 711/104 |
| 6,519,595 | B1 * | 2/2003 | Rose .......................... 707/10 |
| 6,591,302 | B2 * | 7/2003 | Boucher et al. ............ 709/230 |
| 6,760,304 | B2 * | 7/2004 | Uzrad-Nali et al. ........ 370/229 |
| 2002/0087732 | A1 * | 7/2002 | Boucher et al. ............ 709/250 |

\* cited by examiner

*Primary Examiner*—Zarni Maung
*Assistant Examiner*—Glenford Madamba
(74) *Attorney, Agent, or Firm*—Sughrue Mion, PLLC

(57) ABSTRACT

An apparatus and method are provided for scheduling transmit network events in a multiprocessing environment. Each processing node handles its own linked list of transmit object queues and linked list of transport queues. Therefore efficient handling of the transmit network events is enabled. Queues may be added, made inactive, or removed depending on the status of a specific transmit event the queue handles. By maintaining queues in memory, the apparatus is easily scalable, in linear relationship with the size of the memory made available.

66 Claims, 7 Drawing Sheets

APPARATUS AND METHOD FOR TRANSMIT TRANSPORT PROTOCOL TERMINATION

BACKGROUND OF THE INVENTION

1. Field of the Invention

The present invention relates to the management of network transmission events handled by a multiprocessing system. More specifically, the invention relates to a highly scalable apparatus for managing termination of transmission transport via a plurality of transmit transport queues (TTQs).

2. Background of the Related Art

In the related art, operation in multiprocessing environments can handle tasks requiring a significant amount of computing power, which is best achieved by a plurality of processors operating in parallel. Over time, it has become easier in the related art to integrate more than one processing node on a single chip and thus create a more powerful related art parallel processing unit. While the foregoing related art parallel processing unit is highly effective in general processing applications, there exist other areas where it would be advantageous to employ multiprocessing, such as network processing.

In network processing, many events occur in parallel over short periods of time, and are generally independent of one another. For example, a file transfer protocol (FTP) session initiated by one user may be handled in parallel to another FTP session initiated by that same user or by another user. Also, other types of protocols may be handled in parallel.

In the above related art example, each FTP session generates its own events that follow FTP requirements, but are independent of each other. To achieve higher throughput for FTP in the related art system, these FTP sessions should be handled in parallel.

Network traffic is transported over the related art network using transmission control protocol (TCP) or user datagram protocol (UDP). TCP is used when a reliable transport medium is required, and is applied in the related art as described below.

TCP is a connection-oriented transport protocol that sends data as unstructured streams of bytes by sending a sequence of segments (i.e., a collection of data bytes sent as a single message) individually through the network. By using a sequence number and acknowledgment messages, TCP provides the source node with status of the bytes transmitted to the destination node. When data is lost during transmission, TCP can resend lost data, thereby ensuring reliable connectivity.

The related art TCP data transport process is as follows. First, the data (i.e., a file or a message) is broken into segments. To properly break up the data, the TCP must be notified of the size of the segments that the network is capable of handling, which may vary over time depending on network conditions.

Next, a header is affixed to the beginning of each segment. The header includes information related to the transmission of the segment, such as the source address, the destination address, the source port and destination port numbers, checksum information, segment length and a byte sequence number. In the header information, the checksum field contains a digest of the header and the payload, and confirms correct reception of data. The segment length field of the header specifies the number of payload bytes contained in the segment, and the sequence number of the header indicates the position of the last byte of the segment in the continuous byte stream.

After affixing the header, TCP sends the datagram to the destination and waits for an acknowledgement indicating successful transmission. The acknowledgment message may be piggybacked on an incoming segment directed to the source. If the sender (i.e., the source node) does not receive the acknowledgement message within a defined amount of time, the source node resends the unacknowledged bytes.

At the destination node, TCP receives the segment and performs a checksum test. If checksum test passes and no data bytes were lost, the destination TCP acknowledges the source TCP, as described above. Thus, the transmission process is complete.

In the related art, scaling software-based solutions for higher performance is considered a significant challenge, because the related art system usually correlates the number of bits per second to be transferred with the number of instructions per second to be processed. Accordingly, at the TCP level, it would be necessary for processors to be capable of providing performance of 10 giga instructions per second for a 10 Gbps network, resulting in a very high related art system cost.

With the advent of related art high speed network systems capable of transmission at speeds of over one gigabit per second (e.g., related art 1 Gbps and 10 Gbps systems) it would be advantageous to move the related art software based activities for TCP to a hardware environment. However, the related art does not include such a solution for TCP.

Therefore, the related art system has various problems and disadvantages. For example, but not by way of limitation, the related art system cannot produce the aforementioned desired high performance, because of the above-noted deficiencies of the related art software TCP system. As noted above, attempting such a high performance software solution would have a tremendously high cost due to its complexity.

Further, the challenges that require addressing in a multiprocessing environment for termination of transmit transport in a computer network are substantially different from the challenges of general application multiprocessing. For example, but not by way of limitation, traffic flowing over the network must be handled efficiently without impacting overall system performance.

SUMMARY OF THE INVENTION

It is an object of the present invention to overcome the various problems and disadvantages of the related art.

It is also an object of the present invention to provide an easily scalable hardware solution for processing TCP level activities.

It is another object of the present invention to provide a plurality of processing nodes, in hardware that operate in parallel for TCP processing activities.

To achieve at least the foregoing objects, an apparatus for managing a host event of transmission between a first node and a second node is provided, comprising a queue manager and scheduler (QMS), coupled between a first memory and at least one processor, and a data manager coupled between a second memory and the at least one processor, wherein the QMS and the data manager are configured to communicate with one another via an interface.

Additionally, a method of handling a transmit transport protocol termination of a host event between a source to a destination is provided, comprising the steps of (a) receiving a host event request by a source coupled to a destination, and placing the host event request in a first queue, (b) identifying the host event and transferring handling of the identified host event to a second queue, and (c) prefetching and forwarding control information corresponding to the host event from the source to a processing node allocated to handle the second queue. The method also comprises (d) handling the identified host event in the processing node, and (e) receiving an acknowledgement from the destination indicative of one of: (i) successful completion of the host event and subsequently releasing the second queue from further handling of the identified host event, and (ii) unsuccessful completion of the host event and subsequently maintaining control of the second queue to complete the host event, wherein the first queue and the second queue correspond to the host event.

Further, a queue management system is also provided, comprising An apparatus for handling transmit transport protocol termination of a host event of a connections between a source and a destination, comprising a queue manager and scheduler (QMS) that receives the host event and schedules the host event for handling by an object queue.

BRIEF DESCRIPTION OF THE DRAWINGS

The accompanying drawings, which are included to provide a further understanding of preferred embodiments of the present invention and are incorporated in and constitute a part of this specification, illustrate embodiments of the invention and together with the description serve to explain the principles of the drawings.

DETAILED DESCRIPTION OF THE INVENTION

Reference will now be made in detail to the preferred embodiment of the present invention, examples of which are illustrated in the accompanying drawings. In the present invention, the terms are meant to have the definition provided in the specification, and are otherwise not limited by the specification. Further, advantages of these and the stated objects reside in the details of construction and operation as more fully hereinafter described and claimed, reference being made to the accompanying drawings forming a part hereof, wherein like numerals refer to like parts throughout.

For purposes of the present invention, the following definitions are provided. However, the definitions are merely exemplary, and are not intended to limit the scope of those terms as would be understood by one of ordinary skill in the art. For example, but not by way of limitation, "network event" may be defined as an event where information is passed over a network, either downstream (i.e., source to destination) or upstream (i.e., destination to source); "network connection" may be defined as a connection between a source node and a destination node opened on a network. Further, "host event" may be defined as a network event where information is sent from a host to the system of the present invention for TCP level processing (e.g., a transmit event, including, but not limited to, the receipt of commands from a host and protocol time-out events). Also, "queue event" may be defined as sending a work item descriptor (WID), as defined in more detail below, from a queue to a processing node.

Figure 1:
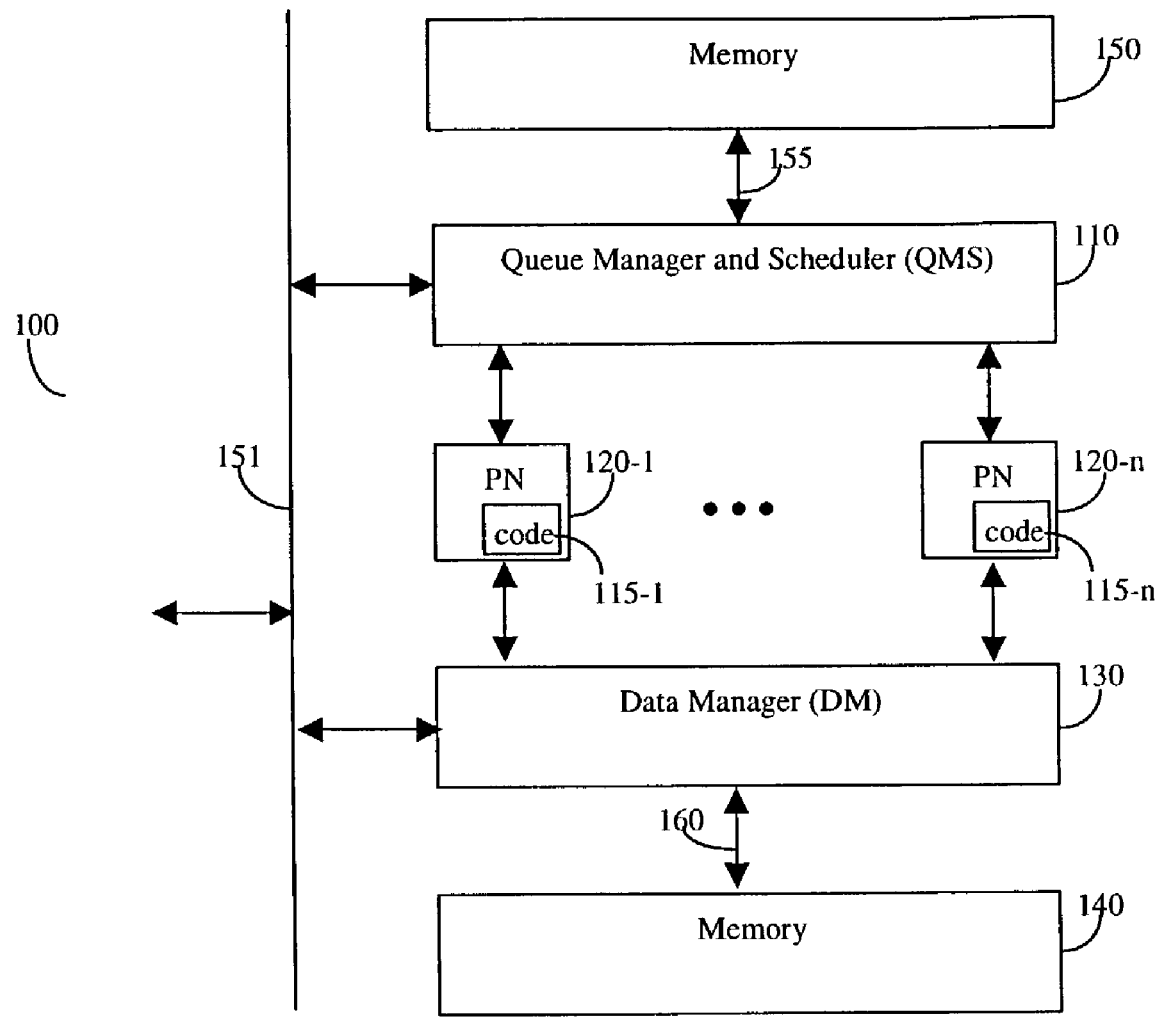
FIG. 1 illustrates a schematic block diagram of an apparatus according to an exemplary description of the present invention.

FIG. 1 illustrates a non-limiting exemplary block diagram of a hardware apparatus 100 for scheduling network events, and specifically host events, in a multiprocessing environment according to the present invention. The apparatus 100 includes a queue manager and scheduler (QMS) 110, one or more processing nodes (PN) 120-1 . . . 120-$n$, a data manager (DM) 130, a first memory 140 coupled to the DM 140 via an interface 160, and a second memory 150 coupled to the QMS 110 via an interface 155. Typically the first memory 140 is implemented using dynamic random access memory (DRAM), and the second memory 150 is implemented using static random access memory (SRAM).

Information on host events is received over an interface 151, where control information is transferred to the QMS 110 and data is transferred to the DM 130. Data is transferred between the DM 130 and the first memory 140 as each PN 120 has one or more direct memory access (DMA) engines that enable the PN 120 to pre-fetch data relevant to its activity prior to the PN 120 commencing work on a scheduled queue event.

The first memory 140 stores information related to host events, packets received from the network, and data products that are the result of PN 120 processing. However, the first memory 140 is not limited thereto, and may also store other data.

The second memory 150 is used for the implementation of a plurality of queues, wherein each queue is associated with a single PN 120. Each queue may also include pointers, including (but not limited to) pointers to the first and last memory object descriptor (MOD) associated with the queue, and offset fields, as described in greater detail below.

Queues may be opened, closed, or made inactive, all per network connection and as may be necessary for the processing of host events, as further explained below. Each PN 120 has a local memory for local processing and a code memory 115 that can be loaded with instructions (e.g., code) to perform tasks relative to the processing required by a host event or queue event. Each PN 120 is also capable of handling multiple queues.

Figure 2:
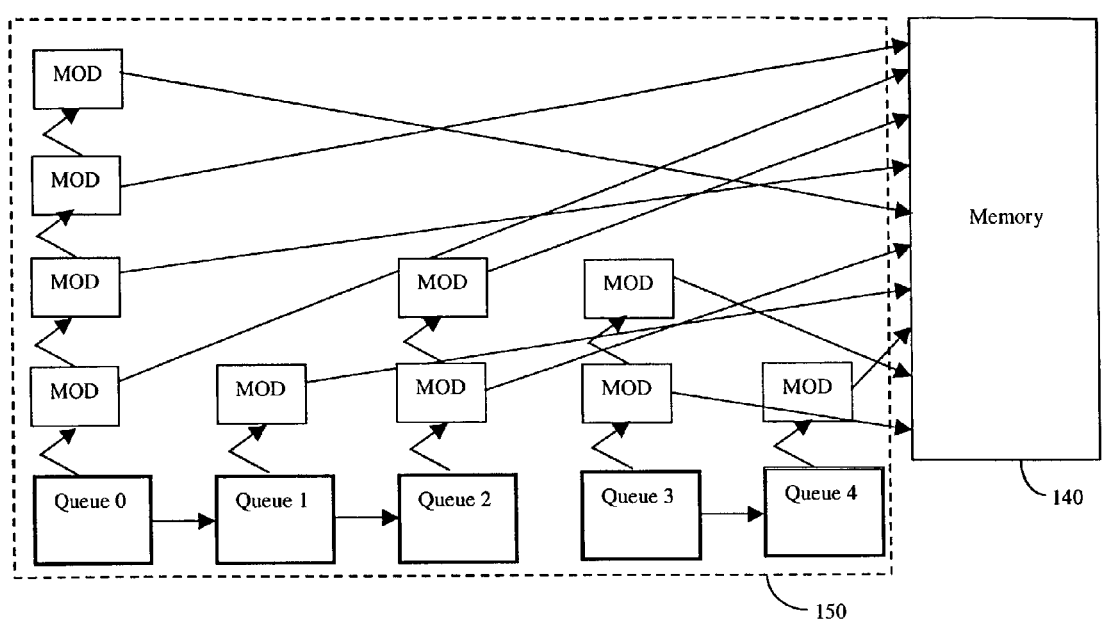
FIG. 2 illustrates a schematic block diagram of the functionality of the queues according to the present invention.

FIG. 2 illustrates an exemplary diagram of the operation of the queues according to the present invention. For example, but not by way of limitation, two groups of queues are shown. Queues "0", "1" and "2" belong to a first linked queue group, and queues "3" and "4" belong to a second linked group. Each queue may have a plurality of memory object descriptors (MODs). The queues and MODs are located in the second memory 150, and the MODs are added to the queue as new host events.

The MOD according to the present invention has pointers, including, but not limited to, a pointer to a memory location, such as a memory location where a control data block (CDB) is stored, or a pointer to another MOD. If the MOD is the last MOD in the series, then the next MOD pointer may be set to null.

To efficiently handle a host event such as transmit events, information for a next transmit event is placed in a local memory of the PN 120-1 prior to processing of the transmit event to ensure that PN 120-1 is efficiently used, and to ensure that time is not wasted fetching information from remote memory locations. However, blocks of data requiring transfer from one location to another are not moved at this time, as they are not necessary for the processing itself and are simply to be moved from the source node to the destination node. Once a PN 120-1 is ready to handle its next task, it can do so with minimal task switching time.

Figure 3A:
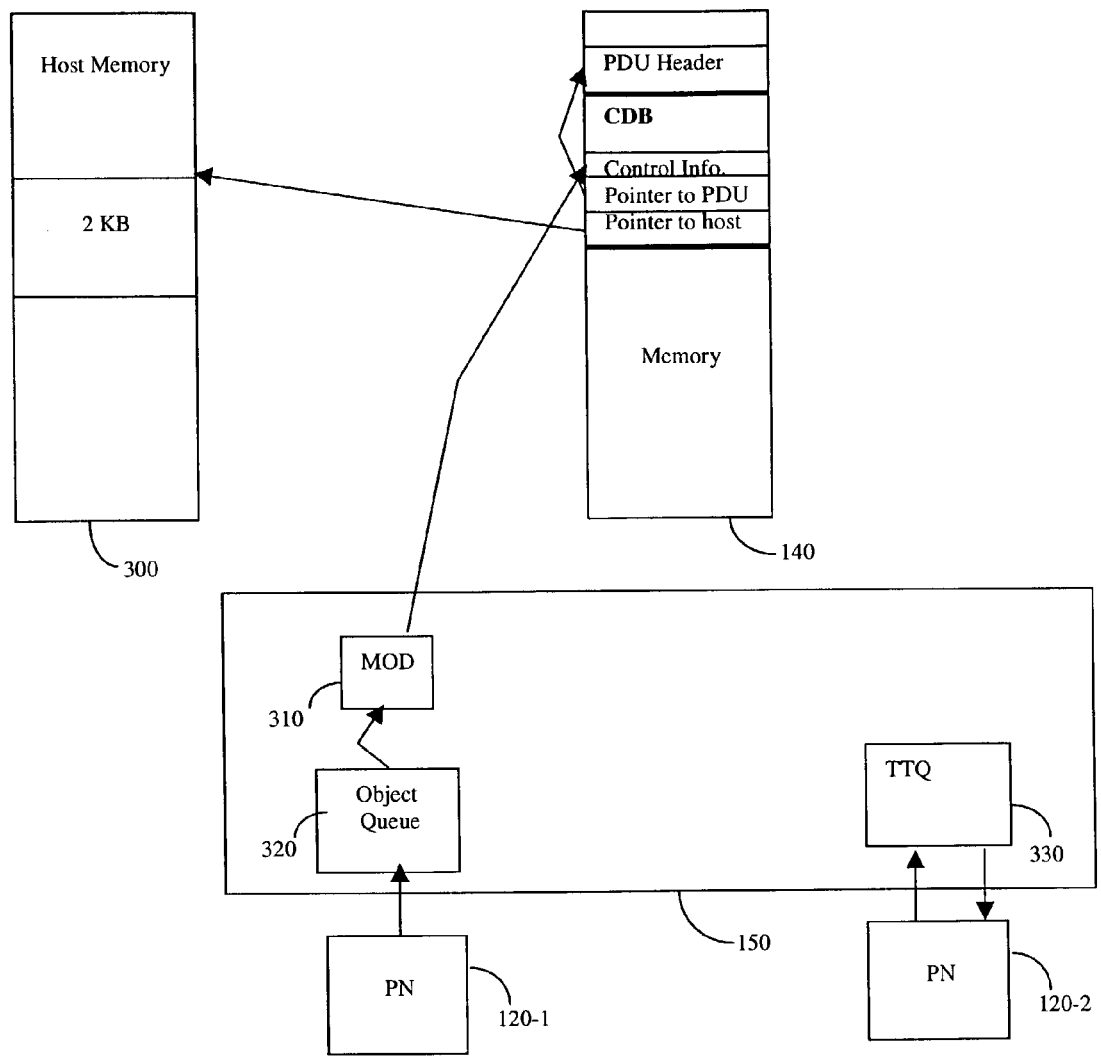
FIGS. 3(A)–3(D) illustrate exemplary descriptions of data transmission over an open connection link according to the present invention.

FIG. 3A illustrates an exemplary transmission of two kilobytes of data according to the present invention. It is assumed that a connection is established and the necessary queues are available and opened upon the detection of the connection type. An object queue 320 associated with PN 120-1, and a TCP transmit queue (TTQ) 330 associated with PN 120-2, are made available for the connection, and reside in the second memory 150. Both the object queue 320 and the TTQ 330 may be associated with a single PN, for example PN 120-1, or may be associated with different PNs, as illustrated in FIG. 3A.

Data is transmitted from a host memory 300 to a destination node as follows. The host memory 300 sends the command data block (CDB) to apparatus 100, hence initiating a host event. The CDB includes (but is not limited to) a pointer to the data in host memory 300, a place holder pointer to a protocol data unit (PDU) header to be created by the PN 120-1 based on information contained in the CDB, and control information.

The apparatus 100 stores the received CDB in the first memory 140. Upon receiving the CDB, object queue 320 allocates a single MOD 310, which is located in the second memory 150 and includes a pointer to the received CDB. A PN (e.g., PN 120-1) creates the PDU header based on the control information in the CDB that is pointed to by MOD 310. The PDU header is stored in the first memory 140.

Figure 3B:
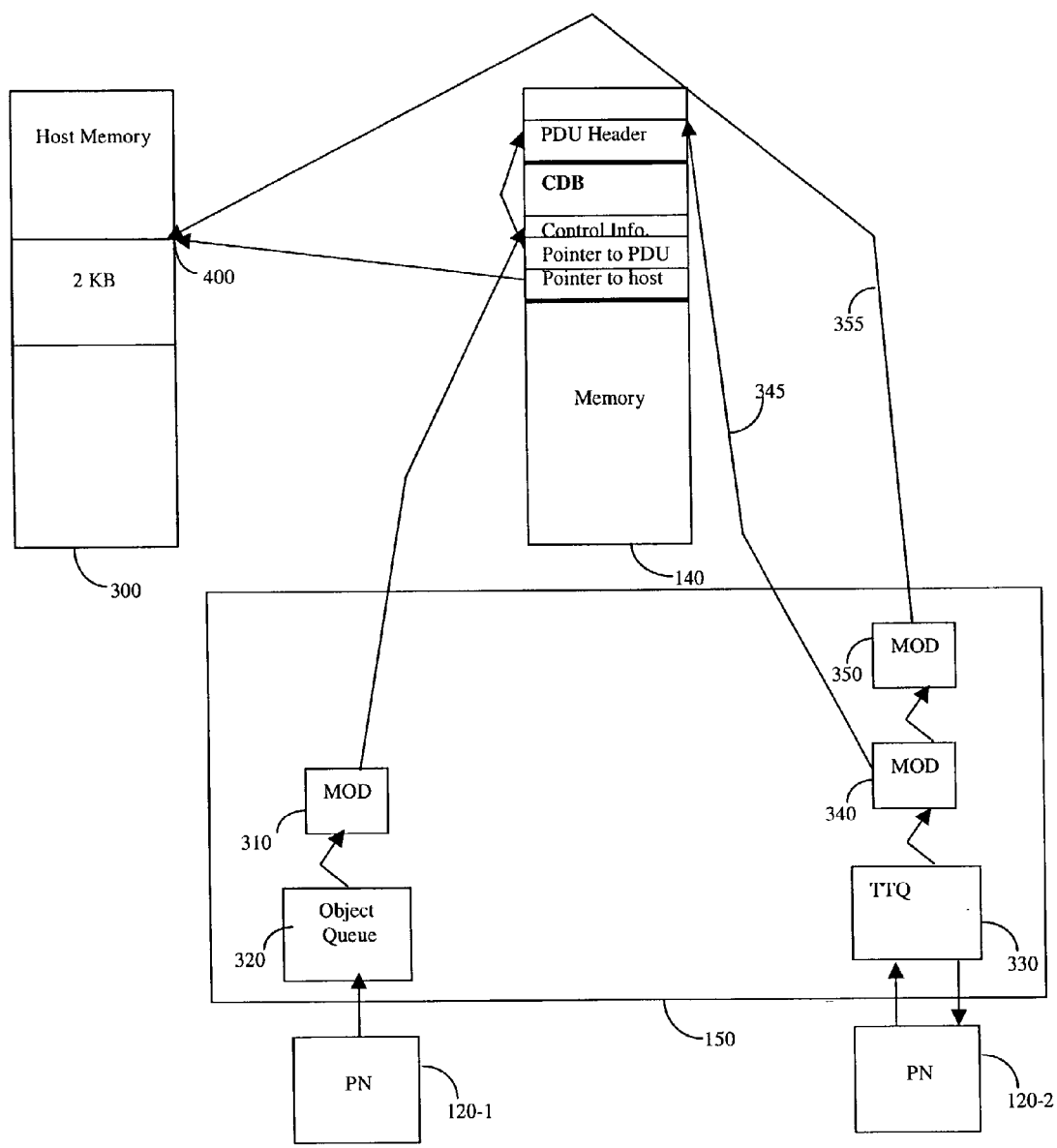

FIG. 3B illustrates an exemplary association of the TTQ 330 to the object queue 320 according to the present invention. PN 120-1 allocates and subsequently links new MODs 340 and 350 to the TTQ 330. TTQ 330 includes several pointers, such as an MOD identification (MODID) pointer, an offset pointer, and a metadata pointer (MDP). The pointers are described below. MODs 340 and 350 are necessary so as to handle data in two separate memories, memory 140 and host memory 300 respectively.

The MODID points to the next MOD to be used, e.g., MOD 340. The offset pointer is used as an offset value to the pointer of the MOD pointed to by MODID pointer and the offset pointer is used in conjunction with pointers 345 and 355, as explained below. The MDP points to the last transmitted byte that has received an acknowledgement message from the destination. MOD 340, in the second memory 150, includes the pointer 345 that points to the beginning of the PDU header located at the first memory 140, and MOD 350 includes the pointer 355 that points to the beginning of the data 400 (e.g., the two kilobytes of data in host memory 300 to be transmitted to a destination).

Figure 3C:
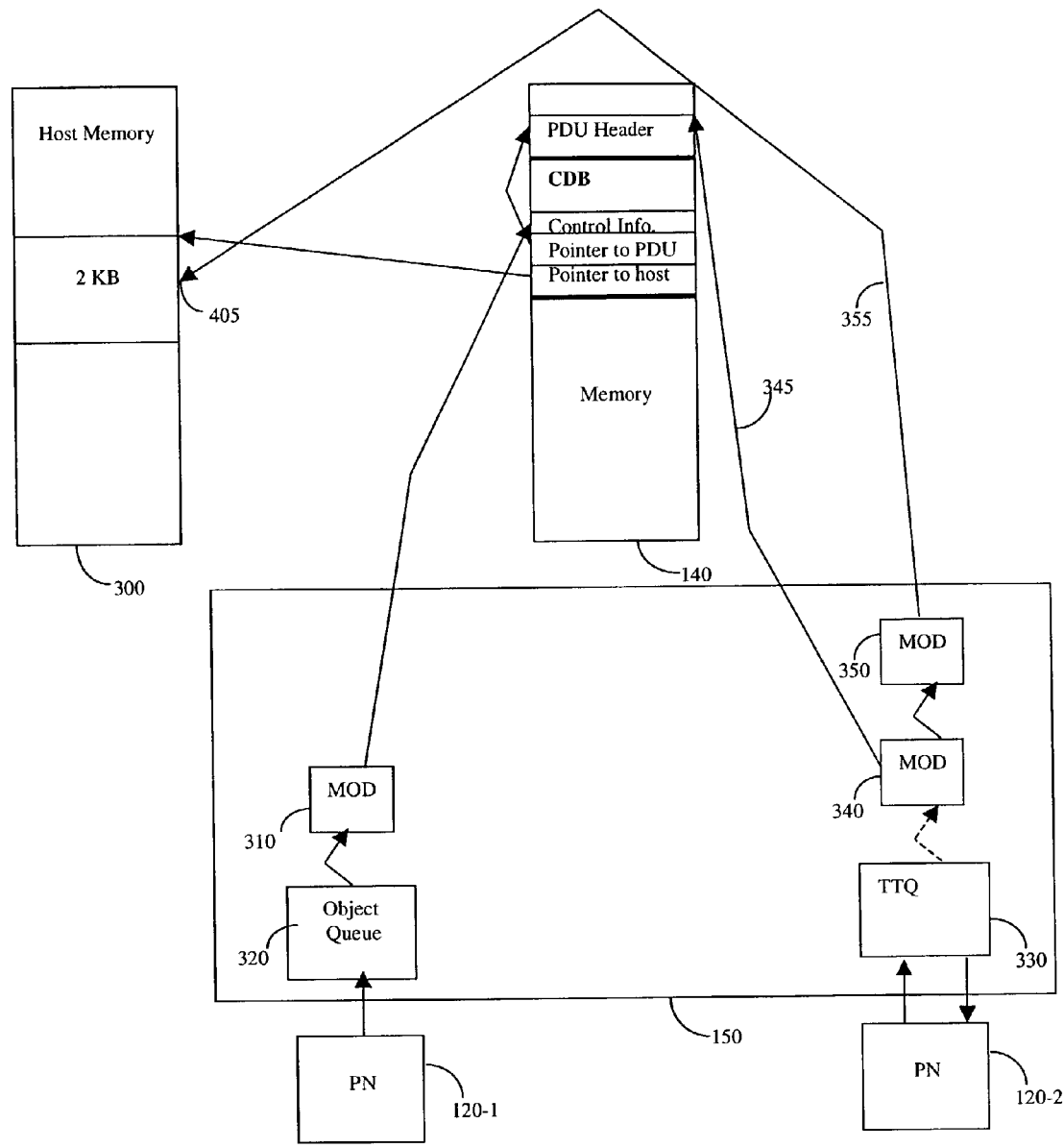

FIG. 3C illustrates an exemplary process of transmitting data according to the present invention. Once the MOD 340 and the MOD 350 are initialized, the TTQ 330 sends a work item descriptor (WID) to PN 120-2. The WID includes the number of bytes in host memory and the size of the PDU header. After execution of the task corresponding to the sent WID, PN 120-2 sends TTQ 300 an acknowledge message (PN_ACK). The PN_ACK includes the number of bytes that PN 120-2 actually transmitted. For example, but not by way of limitation, if host memory 300 has 2 KB (i.e., 2048 bytes) to transmit and the PDU header size is 48 bytes, then TTQ 330 sends a WID with the value of 2096 bytes, i.e., 2048+48. Subsequently, PN 120-2 will send PN_ACK with the number of bytes actually transmitted. For example, but not by way of limitation, the PN_ACK value may be lower than the WID value.

Next, the PDU header is transmitted by PN 120-2, and the MOD 340 is used as the MODID in the TTQ 330 and initially points to the MOD 340. The offset value begins as zero, and is added to the pointer value in MOD 340. Thus, the content of the PDU header is transmitted.

As the data pointed to by MOD 340 is processed, the pointer to the next MOD, pointed to by MOD 340, is used by TTQ 330 to update the value of MODID. The MOD 350 is pointed to by the TTQ 330. In addition, the value of the offset pointer is again set to zero.

It should be noted that the corresponding MDP is not updated at this time, and is only updated on receipt of an acknowledgement message from the destination to indicate that the respective bytes have been received. If PN 120-2 sends a PN_ACK with a value of 1072 bytes, i.e. 1024+48, indicative of half of the transmissions being completed, TTQ 330 updates the offset pointer value to 1024. As a result, the value of the MOD 350 pointer plus the offset pointer at TTQ 330 (i.e., the pointer 355) points to the middle 405 of the 2 KB data block at host memory 300. Hence, the last 1024 bytes at host memory 300 are pointed to for subsequent transmission, as shown by the broken line in FIG. 3C.

After the first 1 KB (i.e., 1024 bytes) of data is transferred to the destination, the following steps occur. Because not all of the data has been sent, first, TTQ 330 sends a new WID to PN 120-2 indicative of the remaining data to be transferred, e.g., 1 KB. A process substantially similar to the process described above takes place once more, to ensure transmission of the remaining data to its designated destination. MDP is changed only when the destination node sends an acknowledgement message, indicative of the number of bytes received by the destination node (e.g., at a user's computer).

Figure 3D:
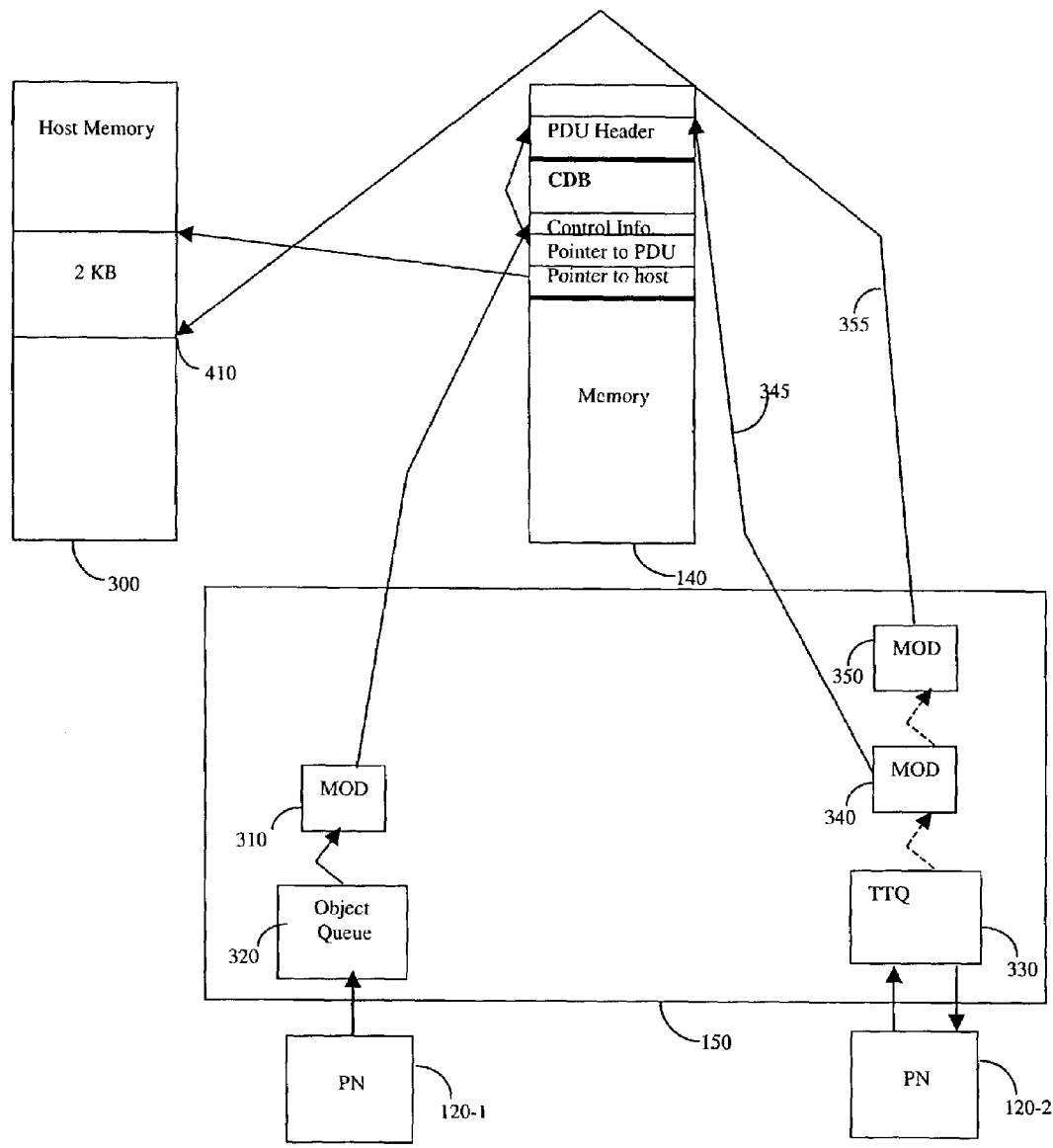

The status of the pointers after the completion of the transmission is shown in FIG. 3D. In contrast to FIG. 3C, pointer 355 in FIG. 3D, which is the combination of the pointer value from MOD 350 and the offset value residing in TTQ 330, points from the host to the end 410 of data in memory 300. In this non-limiting, exemplary embodiment, FIG. 3C illustrates that only 1 KB of data has been sent. However, once this sequence has been repeated, the pointer is updated as illustrated in FIG. 3D to indicate that all of the 2 KB of data has been sent. However, it is also possible that not all of the data would be sent after the 1 KB had been sent such that multiple iterations of the process would be required to complete the data transmission. In such a case, the pointer 355 would be updated accordingly to point to the next byte to be sent, and the sequence is repeated until all bytes are sent. The offset value enabling this resides in TTQ 330 as mentioned above.

Accordingly, the pointers are invalidated, or released, only when the destination node acknowledges that substantially all of the data was received are the pointers removed (i.e., the MODs are invalidated from their reference to the TTQ 330). The pointers are invalidated, or released, at this point to ensure that the system according to the present invention retains the ability to re-transmit if a part of the data was not received by the destination node. The above-described process performed by PN 120-2 may be performed in various time slots allowing PN 120-2 the opportunity to handle other processes or tasks.

Figure 4:
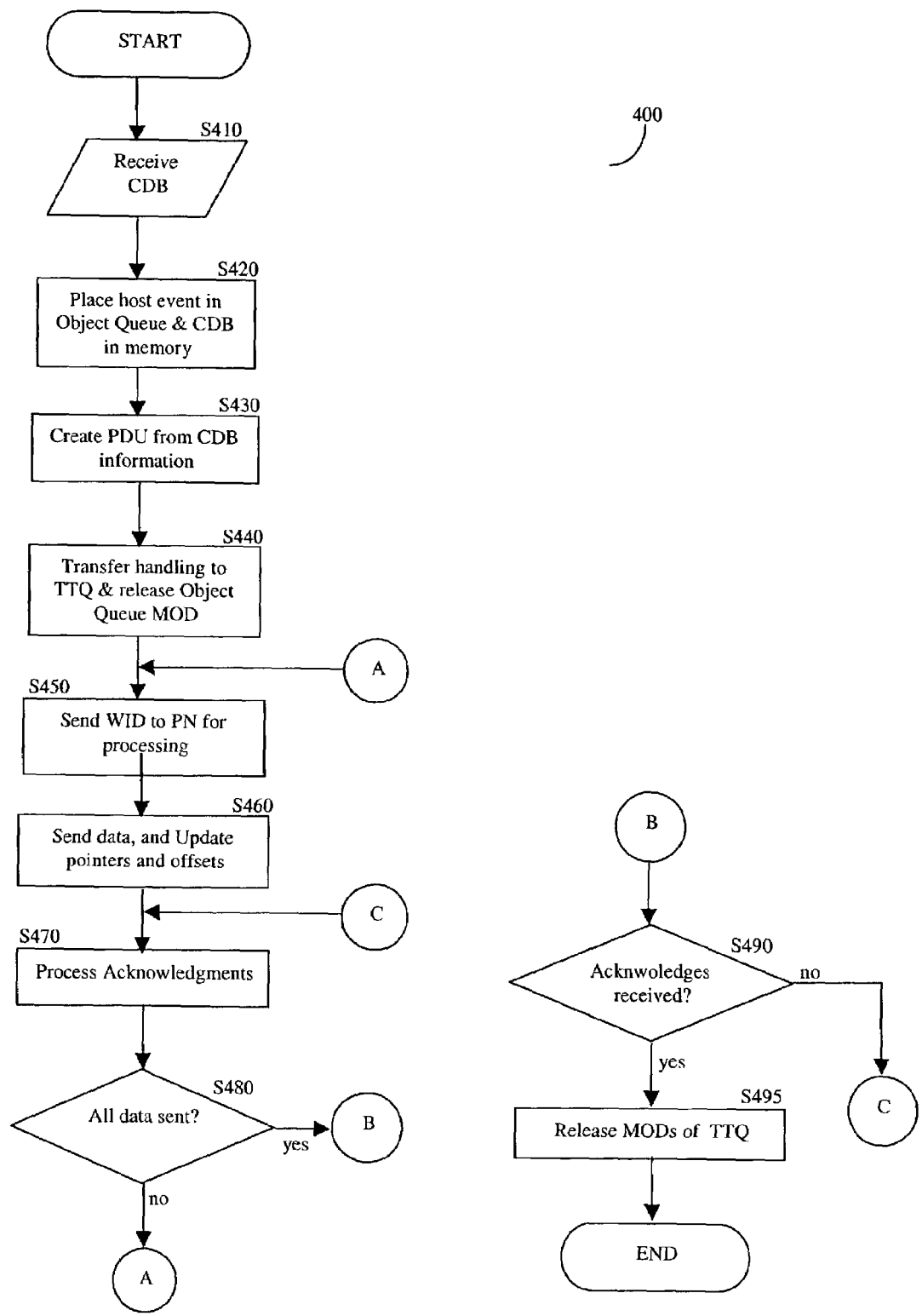
FIG. 4 illustrates an exemplary method according to the preferred embodiment of the present invention.

FIG. 4 illustrates an exemplary method according to the present invention. The details of the steps of the method are described above with respect to FIGS. 3A–3D. However, that description is not intended to be limited thereto. In step S410, a network request, in the form of a CDB, is received from the source (i.e., first node). As noted above, the source is coupled to a destination (i.e., second node).

Next, at step S420, the host event request is placed in the object queue, which is located in memory 150, and queue management is performed by the QMS 110. The respective CDB, handled by the object queue and pointed to by an MOD associated with that object queue, is stored in memory 140.

Then, at step S430, the PDU is created by the processing node that is handling the respective object queue, and is placed in memory 140. At step S440, handling of the host event is transferred to a TTQ designated to handle the host event of the identified type. The MOD that handled the CDB in conjunction with the object queue is then released, and MODs, respective of the designated TTQ pointing to the PDU header in memory 140 and to the data in memory 300, are enabled.

At step S450, the TTQ sends a WID (e.g., information on the number of bytes to be transmitted and the PDU header size) to processing node 120-1. In the preferred embodiment of the present invention, the data necessary for the operation of the processing node is pre-fetched to the local memory of the processing node. At the processing node, the initiation of data transfer from memory 300 to destination, the update of MODs, pointers and offsets, is handled at step S460.

Once the host, event has been handled as described above, an acknowledgement message is expected at step S470. At step S480, it is determined whether all the data from memory 300 has been sent. If all the data was not sent, the execution continues with step S450.

However, if all the data has been sent, execution continues with step S490, where it is determined whether all the data sent has received an acknowledgment. If the answer is affirmative, then execution ends with step S495, where the MODs respective of the TTQ are released. However, if not all the data has been acknowledged as received by the destination, execution continues with step S470 to allow, if necessary, retransmission of unacknowledged data as would be detected by step S480.

In the foregoing exemplary method, the object queue and the TTQ are allocated in the second memory 150. In one embodiment of the invention, both queues are configured to share the same processing node 120-1, based on a queue prioritization process. The processes may include, but are not limited to, round robin, weighted round robin, random and least recently prioritized. In another embodiment, each queue is handled by a different processing node. An object queue may point to another object queue, while a TTQ may point to another object queue. Linked queues may be handled by a single processing node.

The processing nodes can include a local memory and the code memory 115-n. The code memory can include downloadable memory. Additionally, the code memory can be a direct memory access controller (DMAC) that interfaces with the second memory 150, the local memory and the host (i.e., source node) memory.

Additionally, each of the queues points to the MOD, and as noted above, the MOD may point to another MOD, which points to a third MOD. The MOD can also point to the CDB, which stores control information as well as information on the location of data in the first node (i.e., host). As discussed above, the second queue comprises the MODID pointer, the offset pointer and the metadata pointer.

The present invention has various advantages. For example, but not by way of limitation, the present invention is easily scalable, in linear relationship with the size of the memory made available. Additionally, the invention overcome at least the aforementioned problems and disadvantages of the related art.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An apparatus for managing a host event of transmission between a first node and a second node, comprising:
   a queue manager and scheduler (QMS), coupled between a first memory and at least one processor; and
   a data manager coupled between a second memory and said at least one processor, wherein said QMS and said data manager are configured to communicate with one another via an interface.

2. The apparatus of claim 1, wherein said first memory comprises a first queue system comprising an object queue and a second queue system comprising a linked list of queues including a first queue connected to a second queue.

3. The apparatus of claim 2, wherein each queue of said first queue system and said second queue system are connected by a pointer to a memory object descriptor (MOD).

4. The apparatus of claim 3, wherein said MOD comprises a pointer pointing to a location in said second memory, and said pointing is performed by combining an offset value located in said object queue with the value of said pointer.

5. The apparatus of claim 3, wherein said MOD is connect to another MOD via a pointer, and said MOD and said another MOD are connected to said second memory via another pointer, and said another MOD points to a control data block (CDB) in said second memory, said CDB being indicative of a location of data in said first node.

6. The apparatus of claim 3, wherein said second queue system is a TCP transmit queue (TTQ) configured to send a work item descriptor (WID) that is indicative of a task to be performed for said host event, to said at least one processor.

7. The apparatus of claim 6, wherein said TTQ points to said MOD by:
   a MOD identification pointer (MODID) that points to a next MOD to be used;
   an offset pointer indicative of a beginning of data to be transmitted to said second node; and
   a metadata pointer (MDP), wherein said MDP includes a last transmitted byte for which an acknowledgement message has been received indicating that said second node has received a data transmission.

8. The apparatus of claim 7, wherein said offset pointer is used as an offset value from a pointer in a MOD pointed to by said MODID.

9. The apparatus of claim 7, wherein in response to receiving said acknowledgement message, said TTQ updates at least one of said MOD identification pointer, said offset pointer, and said MDP.

10. The apparatus of claim 7, wherein said TTQ is further capable of requesting a retransmit of data if said acknowledgement message was not received from said destination, based on said MDP.

11. The apparatus of claim 7, wherein said WID includes a size of a protocol data unit (PDU) header and a number of bytes in a memory of one of said first node and said second node, and said at least one processor transmits an acknowledgement message indicative of a number of transferred bytes, once task execution has been completed.

12. The apparatus of claim 11, wherein said PDU header is (a) updated by sending a new WID to said at least one processor if a number of bytes transferred is less than an actual number of bytes, or (b) initialized for processing a new host event if said number of transferred bytes equals said actual number of bytes.

13. The apparatus of claim 11, wherein said at least one processor positions said PDU header at a location in said second memory pointed to by said MOD, and allocates said another MOD pointing to said PDU header and a third MOD pointing to the beginning of a data block in a memory of said first node.

14. The apparatus of claim 13, wherein upon receipt of said acknowledgement message, said MDP is updated to reflect a number of bytes received by said destination, and upon acknowledgement by said destination of receipt of a last byte, said another MOD and said third MOD are cleared from said second memory.

15. The apparatus of claim 13, wherein said at least one processor generates at least a link between said another MOD and said TTQ, and a link between said another MOD and said third MOD.

16. The apparatus of claim 13, wherein said MOD contains at least a pointer to the beginning of a location in said second memory dedicated for said protocol data unit (PDU).

17. The apparatus of claim 6, further comprising:
a control data block that stores CDB control information; and
a pointer to said PDU header and a pointer to data located in a memory of said first node, wherein said MOD has a pointer to said PDU header and said another MOD has a pointer to a start of data at a memory of said first node.

18. The apparatus of claim 5, wherein upon receipt of said CDB, said QMS allocates said MOD that is associated with said object queue.

19. The apparatus of claim 2, wherein said second queue system comprises a first queue and a second queue that share said at least one processor in accordance with at least one of a round robin, weighted round robin, random and a least recently handled queuing method.

20. The apparatus of claim 2, wherein queues of said first queue system and said second queue system can be one of added, inactivated and removed based on a status of a transmit event.

21. The apparatus of claim 2, wherein as a response to said host event, said QMS directs the host event into said object queue.

22. The apparatus of claim 1, wherein said at least one processor comprises a local memory and a code memory, said code memory comprising a downloadable code for processing said host event.

23. The apparatus of claim 22, wherein said code memory is a direct memory access controller (DMAC) configured to interface with said second memory, said local memory and a host memory.

24. The apparatus of claim 1, wherein said managing of said host event is performed in a parallel processing environment.

25. The apparatus of claim 1, wherein said QMS is configured to perform queue allocation of a queue stored in said first memory to said at least one processor via one of a wireline and a wireless network connection.

26. The apparatus of claim 1, wherein said host event comprises at least one of a transmission request from said first node and a protocol timeout.

27. The apparatus of claim 1, wherein said first memory is an SRAM configured to store queuing information, said second memory is a DRAM configured to store data, and said at least one processor processes a task relative to at least one of a host event and a queue event.

28. A method of handling a transmit transport protocol termination of a host event between a source and a destination, comprising the steps of:
a) receiving a host event request from said source coupled to said destination, and placing said host event request in a first queue;
c) identifying said host event and transferring handling of said identified host event to a second queue;
d) prefetching and forwarding control information corresponding to said host event from said source to a processing node allocated to handle said second queue;
e) handling said identified host event in said processing node; and
f) receiving an acknowledgement from said destination indicative of one of: (i) successful completion of said host event and subsequently releasing said second queue from further handling of said identified host event, and (ii) unsuccessful completion of said host event and subsequently maintaining control of said second queue to complete said host event,
wherein said first queue and said second queue are selected in accordance with said host event.

29. The method of claim 28, wherein said host event is at least one of a request from host and a protocol time-out.

30. The method of claim 28, wherein said first queue and said second queue are allocated in a first memory.

31. The method of claim 28, wherein said first queue is an object queue, and said second queue is a TCP transmit queue (TTQ).

32. The method of claim 28, further comprising at least one of said first queue and said second queue pointing to at least another queue and being linked to said another queue as a linked list.

33. The method of claim 32, further comprising said at least one of said first queue and said second queue alternately sharing said processing node with said another queue.

34. The method of claim 33, said sharing comprising sharing said processing node based at least one of a round robin, a weighted round robin, a random, and a least recently prioritization process.

35. The method of claim 28, wherein each of said first queue and said second queue points to a memory object descriptor (MOD).

36. The method of claim 35, said MOD pointing to at least another MOD.

37. The method of claim 36, said MOD further pointing to a control data block (CDB).

38. The method of claim 35, wherein said MOD comprises a pointer pointing to a location in said second memory.

39. The method of claim 28, wherein said receiving comprises at least receiving a control data block (CDB) from a host, wherein said CDB is stored in a second memory, and upon receipt of said CDB, further comprising allocating a first memory object descriptor (MOD) associated with said first queue.

40. The method of claim 39, wherein said first MOD comprises a pointer to a beginning of a location in said second memory dedicated for a protocol data unit (PDU).

41. The method of claim 39, wherein said identifying comprises generation of a PDU based upon at least information contained in said CDB.

42. The method of claim 35, wherein said transferring comprises creating a link between said a MOD and said second queue, and creating a link between said second MOD and said a MOD.

43. The method of claim 42, wherein said second queue comprises a MOD identification pointer, an offset pointer, and a metadata pointer.

44. The method of claim 43, wherein said MOD identification pointer points to a subsequent MOD, said offset pointer is used as an offset value from a pointer in a MOD pointed to by said MOD identification pointer, and said metadata pointer points to a last byte that has received an acknowledge message from a respective destination.

45. The method of claim 44, wherein said handling said identified host event comprises said second queue sending a work item descriptor (WID) to said processing node.

46. The method of claim 45, wherein said WID contains at least a number of bytes in host memory awaiting transmission, and a header size of a protocol data unit (PDU).

47. The method of claim 45, further comprising said processing node sending an acknowledgement message to said second queue, including at least a number of bytes transmitted to said destination.

48. The method of claim 47, wherein said method further comprises releasing at least said MOD identification pointer and said offset pointer, and a metadata pointer, in response to receiving said acknowledgement message.

49. The method of claim 48, wherein said second queue sends an additional WID to said processing node when said data in said host is not completely sent to a destination.

50. The method of claim 49, wherein said second queue requests a retransmit of data if said acknowledgement message was not received from said destination, based on said metadata pointer.

51. The method of claim 49, wherein upon acknowledgment of receipt by said destination, said metadata pointer is updated to reflect a number of bytes received by said destination.

52. The method of claim 51, wherein upon acknowledgement by said destination of receipt of last byte, said second MOD and said third MOD are cleared from said second memory.

53. An apparatus for handling transmit transport protocol termination of a host event of a connection between a source and a destination, comprising:
a queue manager and scheduler (QMS) that receives said host event and schedules said host event for handling by an object queue.

54. The apparatus of claim 53, further comprising a first memory configured to store said object queue, and at least one processing node configured to process said host event, wherein said first memory and said at least one processing node are commonly coupled to said QMS.

55. The apparatus of claim 54, wherein said QMS allocates said object queue and a TCP transmit queue (TTQ) in said first memory.

56. The apparatus of claim 55, wherein said QMS allocates said object queue and said TTQ via a network connection.

57. The apparatus of claim 54, wherein said QMS allocates said object queue to said at least one processing node.

58. The apparatus of claim 57, wherein said QMS schedules interaction between one of said object queue and said TTQ and said at least one processing node on a periodic basis.

59. The apparatus of claim 58, wherein said periodic basis is determined by at least one of a round robin, weighted round robin, random, least recently handheld methodology.

60. The apparatus of claim 56, wherein said object queue further points to a memory object descriptor (MOD).

61. The apparatus of claim 60, wherein said MOD points to another MOD.

62. The apparatus of claim 60, wherein said MOD further points to a control data block (CDB) indicative of a location of data in said source, said CDB comprising host event control information.

63. The apparatus of claim 62, wherein said host event includes receiving said CDB from a host.

64. The apparatus of claim 63, wherein upon said receiving of said CDB, said QMS allocates said MOD associated with said object queue.

65. The apparatus of claim 5, wherein said MOD is configured to handle data in said second memory, and said another MOD is configured to handle data in a host memory of said first node.

66. The apparatus of claim 14, wherein said MODID, said offset pointer and said MDP are released when said number is bytes equals a total number of bytes in data transmission for said host event.

* * * * *